(12) United States Patent
Allen et al.

(10) Patent No.: US 11,425,113 B2
(45) Date of Patent: Aug. 23, 2022

(54) SYSTEM AND METHOD FOR USING A PROXY TO COMMUNICATE BETWEEN SECURE AND UNSECURE DEVICES

(71) Applicant: Infrared5, Inc., Jamaica Plain, MA (US)

(72) Inventors: Chris Allen, Jamaica Plain, MA (US); Paul Gregoire, Jr., Henderson, NV (US); Todd Anderson, Middlebury, VT (US); Rajdeep Rath, West Bengal (IN); Andy Shaules, Tacoma, WA (US)

(73) Assignee: Infrared5, Inc., Jamaica Plain, MA (US)

( * ) Notice: Subject to any disclaimer, the term of this patent is extended or adjusted under 35 U.S.C. 154(b) by 142 days.

(21) Appl. No.: 16/040,604

(22) Filed: Jul. 20, 2018

(65) Prior Publication Data
US 2019/0028465 A1    Jan. 24, 2019

Related U.S. Application Data

(60) Provisional application No. 62/535,263, filed on Jul. 21, 2017.

(51) Int. Cl.
*H04L 29/06* (2006.01)
*H04L 9/40* (2022.01)
(Continued)

(52) U.S. Cl.
CPC ........ *H04L 63/0823* (2013.01); *H04L 61/256* (2013.01); *H04L 63/0281* (2013.01); *H04L 65/105* (2013.01); *H04L 65/1069* (2013.01); *H04L 65/608* (2013.01); *H04L 67/02* (2013.01); *H04L 67/141* (2013.01); *H04L 67/28* (2013.01); *H04L 61/2514* (2013.01);
(Continued)

(58) Field of Classification Search
CPC ....... G06F 21/00; H04L 9/00; H04L 63/0823; H04L 63/0428; H04L 67/02; H04L 61/256; H04L 65/605
See application file for complete search history.

(56) References Cited

U.S. PATENT DOCUMENTS

| 6,067,545 A | 5/2000 | Wolff |
| 2002/0107982 A1 | 8/2002 | Teodosiu et al. |

(Continued)

FOREIGN PATENT DOCUMENTS

| JP | 2012100206 A | 5/2012 |
| JP | 2016051389 A | 4/2016 |

(Continued)

OTHER PUBLICATIONS

International Search Report in International Application No. PCT/US2018/043000 dated Oct. 2, 2018.
(Continued)

*Primary Examiner* — Joseph P Hirl
*Assistant Examiner* — Leynna Truvan
(74) *Attorney, Agent, or Firm* — Patent GC LLC

(57) ABSTRACT

The present invention relates to systems and methods suitable for establishing communication between secure and unsecure devices. In particular, the present invention relates to systems and methods that enables communication between secure and unsecure devices utilizing communication protocols that require implementation over secured connections.

26 Claims, 8 Drawing Sheets

(51) Int. Cl.

| | |
|---|---|
| *H04L 67/02* | (2022.01) |
| *H04L 61/256* | (2022.01) |
| *H04L 65/65* | (2022.01) |
| *H04L 65/1069* | (2022.01) |
| *H04L 65/1045* | (2022.01) |
| *H04L 67/56* | (2022.01) |
| *H04L 67/141* | (2022.01) |
| *H04L 61/2514* | (2022.01) |
| *H04L 61/2575* | (2022.01) |
| *H04L 61/2589* | (2022.01) |

(52) U.S. Cl.
CPC ...... *H04L 61/2575* (2013.01); *H04L 61/2589* (2013.01); *H04L 63/0428* (2013.01); *H04L 63/168* (2013.01)

(56) References Cited

U.S. PATENT DOCUMENTS

| | | |
|---|---|---|
| 2005/0273849 A1 | 12/2005 | Araujo et al. |
| 2006/0101510 A1 | 5/2006 | Kadyk et al. |
| 2010/0293297 A1 | 11/2010 | Perumal et al. |
| 2011/0022471 A1 | 1/2011 | Brueck et al. |
| 2014/0325078 A1 | 10/2014 | Shan et al. |
| 2015/0095777 A1* | 4/2015 | Lim .................. H04L 67/145 715/716 |
| 2015/0319034 A1* | 11/2015 | Zourzouvillys ..... H04M 7/0075 370/228 |
| 2016/0112521 A1* | 4/2016 | Lawson ............... H04M 15/44 709/227 |
| 2016/0197886 A1 | 7/2016 | Lapidous et al. |

FOREIGN PATENT DOCUMENTS

| | | |
|---|---|---|
| JP | 2020528189 A | 9/2020 |
| WO | 2015038722 A1 | 3/2015 |
| WO | 2019018716 A1 | 1/2019 |

OTHER PUBLICATIONS

Dumaine, Xander, "Surviving Mandatory HTTPS in Chrome—webrtcHacks", URL: https://webrtchacks.com/chrome-secure-origin-https/. Posted on Dec. 17, 2015, retrieved on Mar. 5, 2021, 5 Pages.
European Patent Office, "European Search Report", received for EP Application No. 18834990.6, dated Nov. 6, 2020, 11 Pages.
European Patent Office , "Communication Pursuant to Article 94(3) EPC", European Patent Application No. 18834990.6, dated Oct. 20, 2021, 10 Pages.
WIPO , "International Preliminary Report on Patentability", International Application No. PCT/US2018/043000, dated Jan. 30, 2020, 9 Pages.
Japan Patent Office , "First Office Action received for Japan Application No. 2020-524730", dated Apr. 12, 2022, 4 Pages.

* cited by examiner

SYSTEM AND METHOD FOR USING A PROXY TO COMMUNICATE BETWEEN SECURE AND UNSECURE DEVICES

RELATION APPLICATIONS

This application claims priority to and the benefit of U.S. provisional patent application No. 62/535,263, filed on Jul. 21, 2017, which is incorporated herein by reference in its entirety.

FIELD OF THE INVENTION

The present invention relates to systems and methods suitable for establishing communication between secure and unsecure devices. In particular, the present invention relates to systems and methods that enables communication between secure and unsecure devices utilizing communication protocols that require implementation over secured connections.

BACKGROUND

The advent of the Internet and increased access to computer networks has facilitated the ability for service providers and end users to communicate seamlessly over the Internet to provide access to different services (e.g., streaming, gaming, communication, file transfer, etc.). Service providers and end users can communicate in a number of different ways utilizing different communication protocols. The Transmission Control Protocol (TCP) and the Internet Protocol (IP), for example, are foundational protocols for many protocols used to communicate over the Internet and networks. As the usage of the Internet has grown and different types of Internet enabled devices have become available, other communication protocols have been created to simplify secure communication between devices. For example, end users can access content and services through web browsers and/or mobile applications without having to coordinate a direct connection with another end user or service provider.

With services readily available to users and ease of connectivity between unknown devices, there is an increase in risk associated with communications between those devices. To protect service providers and end users from malicious behavior, a variety of security and restriction standards and protocols have been developed for use when communicating between devices. Internet open standards is an example of such a standard and places certain restrictions on connections (e.g., TCP and User Datagram Protocol (UDP) connections protocols) made from web browser clients. These restrictions are covered in the Cross-origin resource sharing (CORS) standard and can be interpreted differently across different web browsers. In one implementation of CORS, a browser client cannot establish a connection from a secure site to an unsecure endpoint. This requirement is becoming the standard through adoption by mainstream browsers (e.g., such as Google Chrome) and may apply to all browsers as a part of the official HTML5 specification. This has far reaching implications for how data can be shared between devices when a web browser is involved.

One example of such a limitation occurs when a web browser used on a device attempts to make a remote connection to an endpoint with a Web Real-Time Communication (WebRTC) because browser clients have limited access to publish multimedia (e.g., from camera or microphone) when connecting to a remote server. Access can be limited because the server endpoint needs to be secured with an SSL certificate. In particular, similar to CORS, the WebRTC architecture also comes with its own set of rules defined by open standards which define limitations and boundaries for the mechanism flow. One of the core policies being that a secured connection (SSL enabled) is required by WebRTC client to connecting to a remote media server endpoint (e.g., the connection must be established using a secure protocol (typically Secure WebSockets or WSS)). Thus, WebRTC connections require that an SSL certificate be installed on the remote server to which you connect. In situations where multiple media servers in a clustering and/or cloud configuration are needed to handle large amounts of media traffic, all server instances in the cluster which the browser needs to connect to are accessible over a secured connection (SSL enabled) to function under WebRTC. These restrictions have the potential to become a widespread issue because WebRTC offers an optimal low latency framework for communication which has seen a viral adoption over the recent years and usage continues to grow. Therefore, WebRTC is preferred for many implementations for sharing multimedia between devices but cannot currently be utilized efficiently in infrastructures that use cluster/cloud computing.

While the above search restrictions placed on publishing clients, browsers prohibit a connection between a secure client and an unsecure server, and because most web pages are delivered securely today, this means that you absolutely must use secure connections for all browser communication. As service providers begin scaling the architecture outwards (to handle Internet traffic larger than can be handled by a single instance), there will be issues with having to manage SSL certificates for multiple instances in the cluster, which in turn requires each instance to have its own domain name as well as an SSL certificate. More specifically, SSL uses domain names and authorizing entities to validate the certificates, and such that each server instance in the installation would normally require a different domain and its own SLL certificate.

The development of cloud computing also comes with similar issues. Cloud platforms offer dynamic instance management using their Application Program Interfaces (API)s and streaming setups using a stream manager, or other management tool, can utilize auto scaling features of the cloud platform and have server nodes added/removed dynamically in real time as network traffic changes. Irrespective of whether a cluster is manually setup or whether it's created by auto scaling, however, the problem remains the same. More specifically, it is tedious and not practical to set up domains and install certificates for each dynamic cloud instance and for instances being managed through auto scaling.

SUMMARY

There is a need for improvements for providing secure communication between secured and unsecured devices when implementing a protocol that requires secure connections. The present invention provides, in various embodiments solutions to address this need, in addition to having other desirable characteristics.

In accordance with example embodiments of the present invention, method for providing secure communication between secured and unsecured devices is provided. The method includes receiving, at a proxy service via a secure connection, a connection request from a client on a subscriber device, the connection request including a node address for a target publisher device, connecting, via an unsecure connection, the proxy service to the target publisher device, and establishing a bridge between the subscriber device and the target publisher device via the proxy service. The method also includes utilizing a proxy channel over the bridge to negotiate a connection between the subscriber device and exchanging data between the subscriber device and the publisher device over the connection.

In accordance with aspects of the present invention, the proxy service is implemented on a stream manager server configured with a domain name and an Secure Socket Layer (SSL) certificate. The stream manager can be implemented on a cloud infrastructure. The process for establishing the bridge can include negotiating session setup information between the subscriber device and the publisher device using an Interactive Connectivity Establishment (ICE) technique.

In accordance with aspects of the present invention, the bridge can include the connection between the subscriber device and the proxy service which uses a WebSocket secure (WSS) secure connection or a Hypertext Transfer Protocol Secure (HTTPS) connection and the connection between the publisher device and the proxy service which uses a WebSocket (WS) unsecure connection or a Hypertext Transfer Protocol (HTTP) connection. The bridge can enable secure data to flow from a secure subscriber device to an unsecure publisher device.

In accordance with aspects of the present invention, the subscriber device connects to the proxy service from a web browser client. The publisher device can be a media server without a domain or SSL certificate and is configured to broadcast multimedia to connected subscriber devices. The connection can be a direct connection between the subscriber device and the publisher device or the connection is a Network Address Translation (NAT) connection and the connection is configured to exchange multimedia data between the subscriber device and the publisher device.

In accordance with aspects of the present invention, the proxy service is configured to keep the bridge open during the exchange of the multimedia data between the subscriber device and the publisher device using a pinger mechanism. The method can further include balancing load between subscriber devices and publisher devices with a load balancer. The proxy service can provide WebRTC information exchange between the secured and unsecured devices for efficiency and reliability. The publisher device can include streaming clusters including plurality of physical nodes or virtual instances. The method can further include creating custom headers to track original client information for the subscriber device and the publisher device.

In accordance with example embodiments of the present invention, a system for providing secure communication between secured and unsecured devices is provide. The system includes a proxy service in electronic communication with a subscriber device via a secure connection and a target publisher device in electronic communication with the proxy service via an unsecure connection. The proxy service, in response to receiving a connection request from the client device, is configured to establish a bridge between the subscriber device and the target publisher device via the proxy service and utilize a proxy channel over the bridge to negotiate a connection between the subscriber device to facilitate an exchange of multimedia data between the subscriber device and the publisher device over the connection.

In accordance with aspects of the present invention, the proxy service is implemented on a stream manager server configured with a domain name and an Secure Socket Layer (SSL) certificate. The stream manager can be implemented on a cloud infrastructure. The process for establishing the bridge can include negotiating session setup information between the subscriber device and the publisher device using an Interactive Connectivity Establishment (ICE) technique. The bridge can include the connection between the subscriber device and the proxy service uses a WebSocket secure (WSS) secure connection or a Hypertext Transfer Protocol Secure (HTTPS) connection and the connection between the publisher device and the proxy service uses a WebSocket (WS) unsecure connection or a Hypertext Transfer Protocol (HTTP) connection. The bridge can enable secure data to flow from a secure subscriber device to an unsecure publisher device.

In accordance with aspects of the present invention, the subscriber device connects to the proxy service from a web browser client. The publisher device can be a media server without a domain or SSL certificate and is configured to broadcast multimedia to connected subscriber devices. The connection can be configured to exchange multimedia data between the subscriber device and the publisher device and the connection can be a direct connection between the subscriber device and the publisher device or a Network Address Translation (NAT) connection. In accordance with aspects of the present invention, the proxy service is configured to keep the bridge open during the exchange of the multimedia data between the subscriber device and the publisher device using a pinger mechanism.

The method can further include balancing load between subscriber devices and publisher devices with a load balancer. The proxy service can provide WebRTC information exchange between the secured and unsecured devices for efficiency and reliability. The publisher device can include streaming clusters including plurality of physical nodes or virtual instances. The method can further include creating custom headers to track original client information for the subscriber device and the publisher device.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1A:
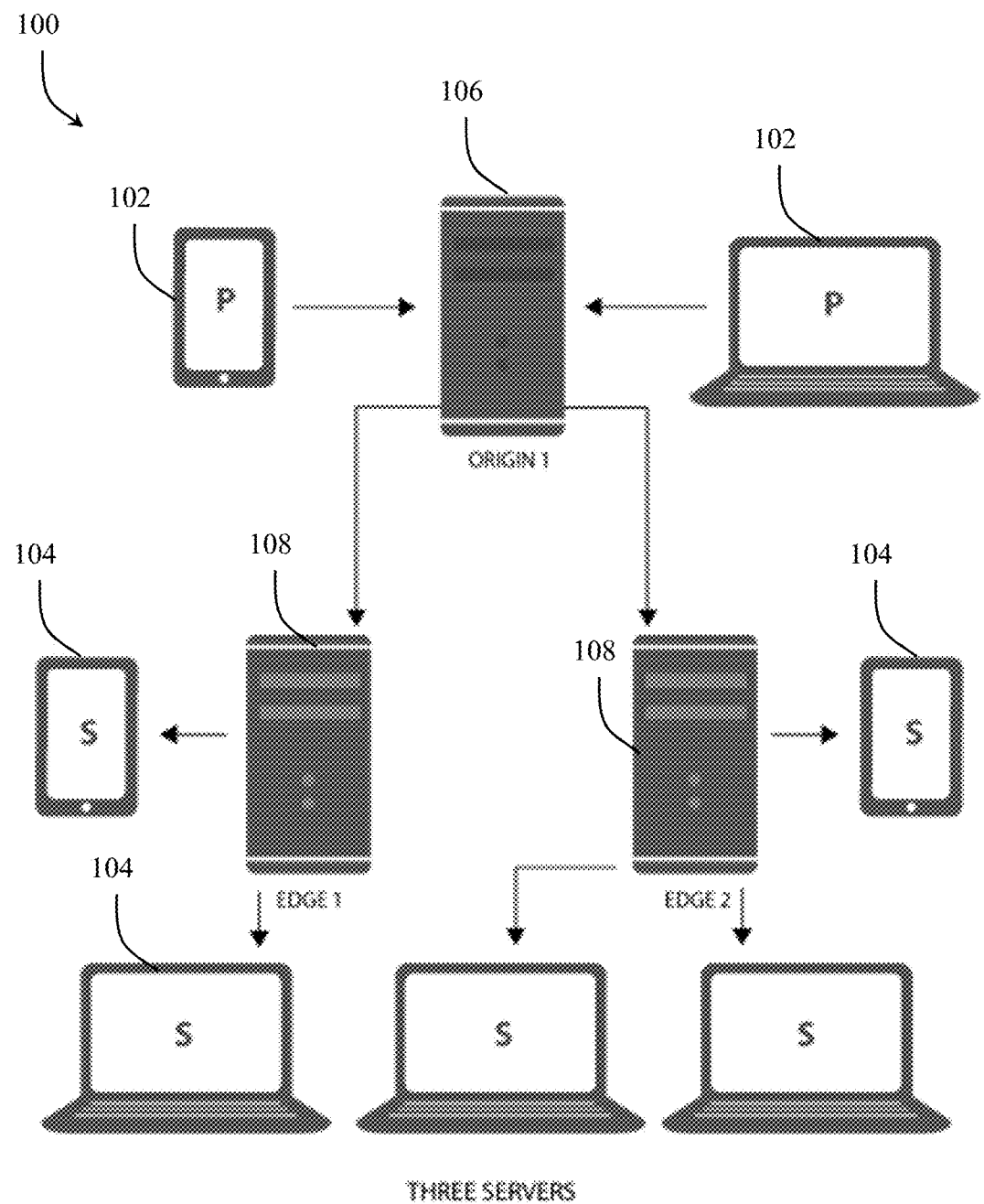
FIG. 1A is an exemplary configuration for a streaming cluster type network, in accordance with the present invention.

An illustrative embodiment of the present invention relates to methods and systems for providing communication between secured and unsecured devices through socket proxying to allow client web browsers on client devices (e.g., subscriber devices) to comply with security policies (e.g., WebRTC, CORS, etc. policies) defined by various open standards. The present invention provides a proxy service implemented with a stream manager server that which can pass data between a secure web browser client and an unsecure connection on the server side (e.g., publisher server devices). More specifically, in an example embodiment, the present invention leverages WebSocket communication from a web browser client to a WebRTC (or similar protocol) based media server node proxied through an intermediary proxy server implemented with a stream manager device.

When implementing a protocol such as WebRTC, HTTPS, etc., if the server is not secured (SSL enabled) the communication will fail. This issue applies to both client to server (publish) data flows or server to client (subscribe) data flows. The stream manager proxy server of the present invention solves the unsecure server access problem by providing a proxy service hosted within itself. Additionally, the WebRTC security policy only blocks client-server connectivity on unsecure connections, not server-server connections. Leveraging this aspect of WebRTC, the stream manager proxy server generates a server to server unsecure connection between itself and the WebRTC media server for every WebRTC client connection that is established using WebSocket using a unique combination of steps that yield an improvement to client to unsecure device communications.

To initialize the stream manager proxy server of the present invention, the browser client provides the stream manager proxy server the public IP address of the media server that it wants to connect to, along with the target media server application scope, over a secure WebSocket connection made between the client and the stream manager proxy server. The stream manager proxy server then creates a server to server connection between itself and the target media server synchronously. The pair of stream manager proxy server to media server connection and client to stream manager proxy server connection, form a bridge which allows the secure client to talk to the unsecure media server.

Once a bridge is established, all parameters passed in by the secure client are transferred to the unsecure target media server as they arrive on stream manager proxy server channel and responses received from the media server are relayed back to the client via the stream manager proxy server channel. This solution makes it possible for a secure client to talk to an unsecure server placed anywhere. Additionally, a proxy channel can be initialized for ICE data exchange and any communication between the server and the client. Once the connectivity is established and ICE exchange is completed successfully, the audio/video flows between the client and server either directly or using NAT (as necessary). The proxy channel remains active for any future communication between the client and the media server and remains open/active and terminates when either the client closes connection or the media server closes the proxy connection. For example, both secure and unsecure connections use a special "ping-pong" or pinger mechanism to keep the WebSocket connection alive even when no useful data flows through them. The "ping-pong" or pinger mechanism can include any combination of active status tracking known in the art, for example, periodically pinging the device to see if it (and the connection with another device) is still active. This solution works equally well with cloud instances as well as managed instances.

Through the implementation of the proxy service, the present invention provides a unique combination of steps that addresses a plurality of problems in the art. More specifically, the present invention provides a unique combination of steps and technologies to provide solutions for real-time data oriented applications where the multimedia data needs to be transmitted from a secure location to one or more unsecure locations. The present invention also addresses issues related to geo location applications where real-time location information needs to be transmitted from a secure application to an unsecure server. Additionally, the present invention can be implemented with any cloud based WebSocket application where the application works with virtual machines with a non-permanent IP address a permanent domain name is not available for SSL certification) and has data that needs to be transmitted in-between servers over WebSocket from secure to unsecure endpoint. Thus, the present invention provides an improvement to at least one technological area which is necessitated by the improvement of technology (e.g., computing devices and the Internet).

Additionally, although the present invention commonly refers to example implementations including web browsers over WebRTC, WebRTC has applications for non-browser devices, including mobile platforms and IoT devices, such that the present invention is not intended to be limited to utilization with web browsers. For example, the present invention could be utilized with browser-based Voice over IP (VoIP) telephony, also called cloud phones or web phones, which allow calls to be made and received from within a web browser, replacing the requirement to download and install a softphone or other similar technologies. Additionally, the solution provided by the present invention is generic to all WebRTC streaming scenarios that fall within the scope of service provided by a media server. For example, the solution provided by the present invention can be applicable to, but not limited to, one to many streaming (one publisher to many subscribers) over WebRTC, one to one streaming over WebRTC (chat), many to many streaming (conferencing) over WebRTC, WebRTC based online video recording (publisher without subscriber), any WebSocket Arbitrary Data Transmission where connectivity rules conform to secure-origin policy and you are unable to setup a SSL enabled domain for the server. Moreover, the present invention is not limited to use of WebRTC but can be implemented within any combination of protocols that do not allow clients to connect to unsecure devices.

FIGS. 1 through 7, wherein like parts are designated by like reference numerals throughout, illustrate an example embodiment or embodiments of improved operation for providing secure communication between secured and unsecured devices, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

The present invention is directed to methods and systems that provide a proxy solution for implementation within existing and future stream manager configurations. As would be appreciated by one skilled in the art, a stream manager is a software application which runs on a web server or other computing infrastructure that can be configured act as an Application Program Interface (API) centered around multimedia streaming. The proxy solution provided by the present invention can be implemented with any combination of stream manager and other multimedia management solutions configured to provide multimedia to end user devices (e.g., through a web browser). For example, the proxy solution provided by the present invention can be deployed within a stream manager implemented on a cloud infrastructure or a hosted/managed infrastructure (consisting of managed physical hardware instead of a virtual machine as provided on cloud). Additionally, the proxy solution provided by the present invention may be described in conjunction with the stream manager terminology because the technical improvement is implemented on the stream manager and runs alongside other services. The proxy solution of the present invention, however, is not directly dependent on the capabilities of a stream manager, and can be extended to any arbitrary browser based application where data is transmitted between a secure and an unsecure endpoint.

Figure 4:
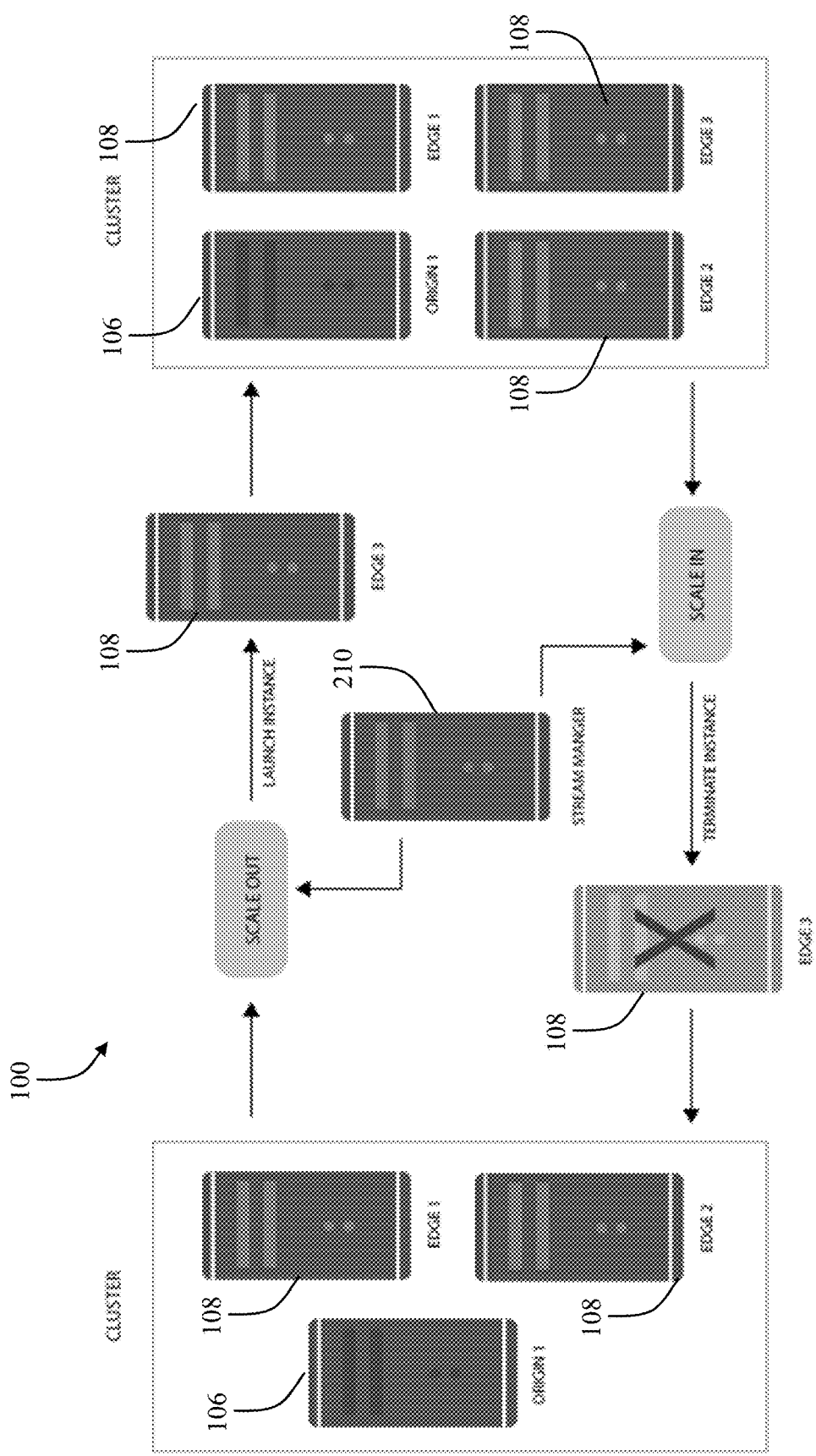
FIG. 4 is an exemplary process for implementing auto scaling with a stream manager, in accordance with the present invention.

The stream manager proxy solution can also be adapted to operate with scalable virtual systems. In cloud infrastructures, for example, a stream manager can manage spinning up and spinning down cloud instances dynamically from a virtual machine image based on a load incurred on the system by connecting clients (e.g., on subscriber devices). In particular, the stream manager can use the cloud platform's API to request creation and/or deletion of instances by providing additional parameters such as instance type, instance tags (meta), a machine image identifier, etc. Scaling up streaming infrastructures in a cloud infrastructure can involve creating clusters of media server nodes (as depicted in FIG. 4) to handle more internet traffic than could be handled by a single server instance. The present invention can be implemented in any combination of network configurations.

FIG. 1A depicts an example of a conventional streaming cluster 100 that includes server nodes grouped together for streaming management, based on their intended role and capacity. In particular, FIG. 1A depicts how publisher devices 102 can publish content to subscriber devices 104 for consumption. As would be appreciated by one skilled in the art, the publisher device 102 can include any combination of computing devices configured to provide and/or receive multimedia to requesting users/device. Similarly, the subscriber device 104 can include any combination of devices configured with a client to request multimedia and/or provide multimedia to other devices. For example, the publisher device 102 can be servers configured to host one-way streaming services provided to other users (e.g., subscribers) or two-way streaming services (e.g., data, video, audio, or combination thereof). In the example system 100 of FIG. 1A, the publisher devices 102 communicates over the network through an origin device 106 (or ingest endpoint) and the subscriber devices 104 communicate over the network through an edge device 108. As would be appreciated by one skilled in the art, the origin device 106 and edge devices 108 can be any combination of computing devices or instances of virtual machines known in the art and can be configured to serve more than one publisher device 102 or subscriber device 104. The origin and edge devices can be provided to establish reliable connections between remote devices (e.g., subscriber/publisher devices).

Figure 1B:
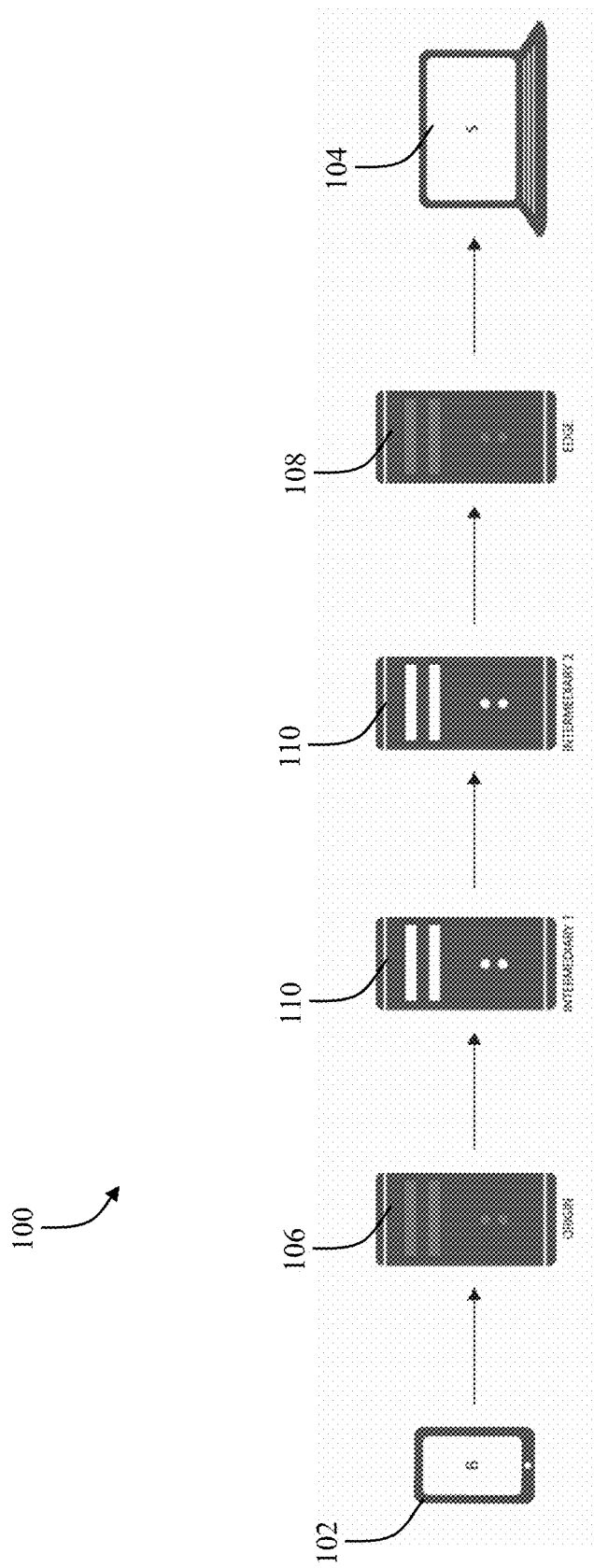
FIG. 1B is exemplary configuration for daisy chain clustering type network, in accordance with the present invention.

As would be appreciated by one skilled in the art, the system 100 is not limited to a two-tier system of origin nodes 106 and edge nodes 108 connected directly to each other. In some configurations, the origin nodes 106 and edge nodes 108 can be connected together in a daisy chain fashion with one or more intermediary nodes 110 bridging the traffic between the remote origin nodes 106 and edge nodes 108 end points, as depicted in FIG. 1B. The use of intermediary nodes 110 in a streaming system is typically for geographic distribution, and allowing clients from multiple dispersed locations to connect with minimal latency. The use of intermediary nodes 110 in a streaming system can also extend the capacity of what a single origin node 106 can deliver to multiple edge nodes 108. Additionally, if relaying nodes or servers are initialized between the origin node 106 and the edge nodes 108, then capacity can expand by the number of edge node 108 connections that each relay can handle.

Regardless of the network configuration, initially, publisher devices 102 and subscriber devices 104 are not necessarily directly connected to each other (e.g., prior to a streaming session). Therefore, a mechanism can be required to coordinate between the publisher devices 102 and subscriber devices 104 to establish a connection for exchanging multimedia. In some embodiments, a stream manager device 210 can be configured to establish the connection and manage communications between the publisher devices 102 and subscriber devices 104. In some embodiments, the stream manager device 210 can be a proxy server with a domain name and has a SSL certificate installed thereon. The stream manager proxy server 210 can be configured to register a WebSocket data listener to handle incoming client connection, manage proxy connections between the publisher devices 102 and subscriber devices 104, and proxy all information received from each of the publisher devices 102 and subscriber devices 104 without any alteration to what is received. The stream manager device 210 can also be configured to allow remote procedure calls (RPC) over proxy connections, allow invocation of client methods from remote media servers, ensure that connections are kept alive even after negotiations are complete, and observer and terminate the communication bridge if either connection or the proxy connection terminates. As would be appreciated by one skilled in the art, the communication between the devices communication can be bidirectional such that either device can initiate an exchange of information. For example, the publisher devices 102 or subscriber devices 104 client can call something on the stream manager device 210 (server), the stream manager device 210 can call specific publisher devices 102 or subscriber devices 104, or the publisher devices 102 or subscriber devices 104 can call one another. Likewise, notifications can be sent to all publisher devices 102 or subscriber devices 104 connected to a single stream.

Figure 2:
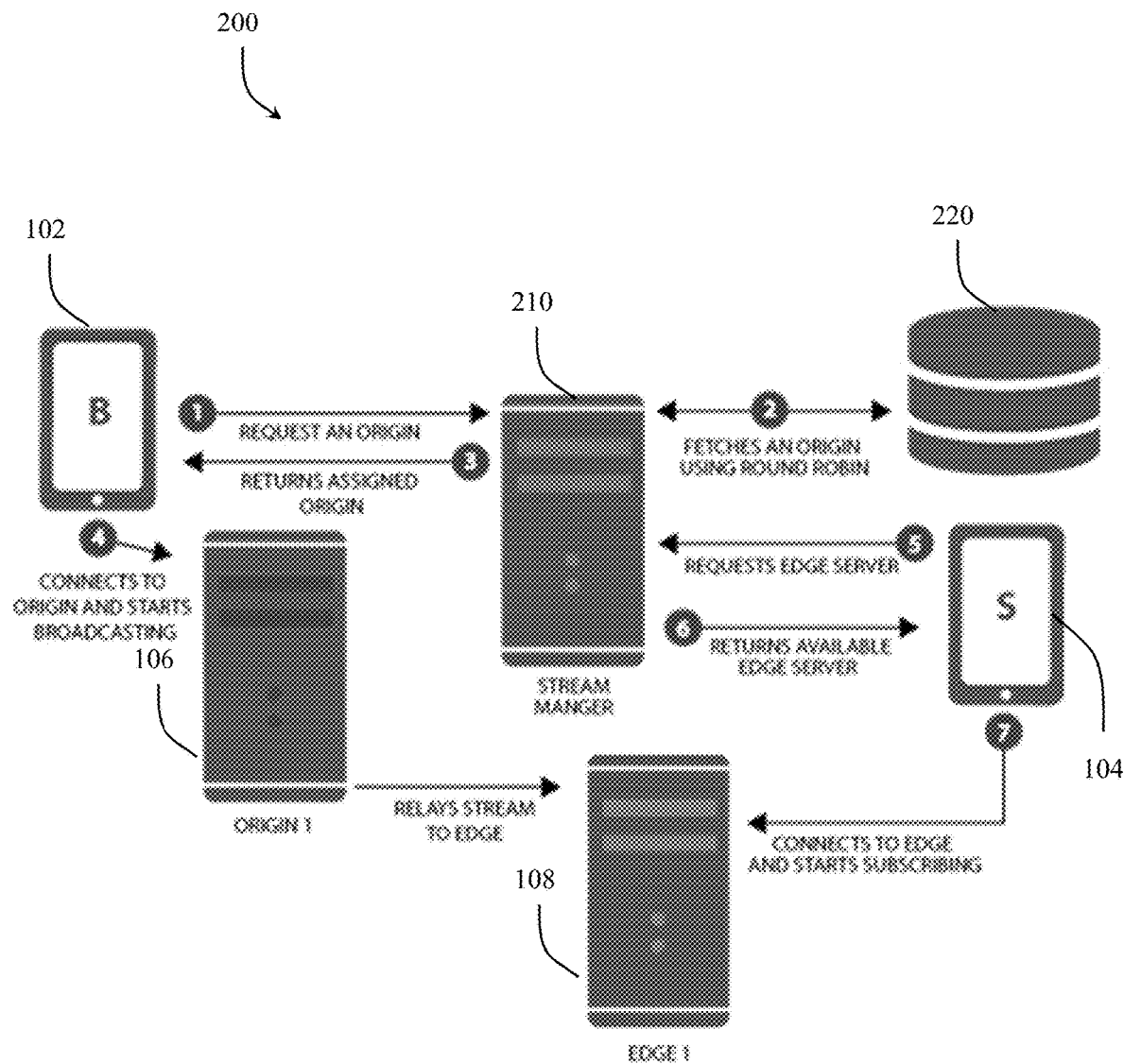
FIG. 2 is an exemplary process for stream manager routing operations, in accordance with the present invention.

FIG. 2 depicts an example implementation and process 200 of a stream manager proxy server 210 establishing a connection between a publisher device 102 and a subscriber device 104 through utilization of an origin device 106 and edge device 108. As would be appreciated by one skilled in the art, the process 200 can be utilized to connect any number of publisher devices 102 or subscriber devices 104 using any combination of intermediary origin devices 106 and edge devices 108 (if any) and is not intended to be limited to the configuration depicted in FIG. 2.

At Step 1 of the process 200, the stream manager proxy server 210 can receive a request from a publisher device 102. For example, the publisher device 102 can transmit a request to the stream manager proxy server 210 to make a multimedia stream available to subscribers. At Step 2 of process 200, the stream manager proxy server 210 can lookup available origin nodes 106 for a broadcast (e.g., from a data store 220) and select an origin node(s) 106 to be utilized. As would be appreciated by one skilled in the art, any combination of selection methods and criteria can be utilized for selecting nodes. For example, the stream manager proxy server 210 can utilize a round robin, logistical regression, or random number generator and criteria such as bandwidth, CPU, and RAM load, geolocation, etc. to select an origin node(s) 106 from the list of available origin nodes 106. At Step 3 of process 200, the stream manager proxy server 210 returns the selected origin node(s) 106 to the requesting publisher device 102. At Step 4 of the process 200, the publisher device 102 can utilize the information provided by the stream manager proxy server 210 to connect to the selected origin node(s) 106.

The process 200 can follow a similar set of steps when establishing an edge node 108 for a requesting subscriber device 104. Specifically, at Step 5 of process 200, the stream manager proxy server 210 can receive a request from a subscriber device 104. For example, the subscriber device 104 can transmit a request to the stream manager proxy server 210 to make connect access to an edge node 108 for accessing a multimedia broadcast. During Step 5 of process 200, the stream manager proxy server 210 can lookup available edge nodes 108 (e.g., from a data store 220) and select an edge node(s) 108 to be utilized for connection to a broadcast (e.g., via the origin node 106). For example, the stream manager proxy server 210 can utilize a round robin or random number generator to select an edge node(s) 108 from the list of available edge nodes 108.

At Step 6 of process 200, the stream manager proxy server 210 on return the selected edge node(s) 108 to the requesting subscriber device 104. At Step 7 of the process 200, the subscriber device 104 can utilize the information provided by the stream manager proxy server 210 to connect to the selected edge node(s) 108. After Step 7 of process 200, a connection has been established between the publisher device 102 and the subscriber device 104 via the origin node 106 and the edge node 108 provided to the respective devices 102, 104 by the stream manager proxy server 210. Thereafter, this connection can be utilized to stream multimedia between devices. Additionally, as would be appreciated by one skilled in the art, the process 200 can be implemented in a system that does not include origin nodes 106 and/or edge nodes (e.g., as depicted in FIG. 3).

In some embodiments, the present invention can be configured to enable reliable bidirectional communication between a browser client (e.g., subscriber device 104) and a media server (e.g., publisher device 102) providing the multimedia content. In for example, the present invention can provide bidirectional communication between a browser on a mobile computing device and a server on a cloud platform, by leveraging WebRTC information exchange between the browser client and the server on by could computing platform (e.g., using process 300). When setting up a WebRTC communication, WebRTC signaling is utilized to exchange information between two participants about each other to setup a multimedia streaming session. This is also known as signaling and negotiation and for signaling and negotiation to succeed, a WebRTC communication requires one of the participants should be on a secure connection.

Figure 3:
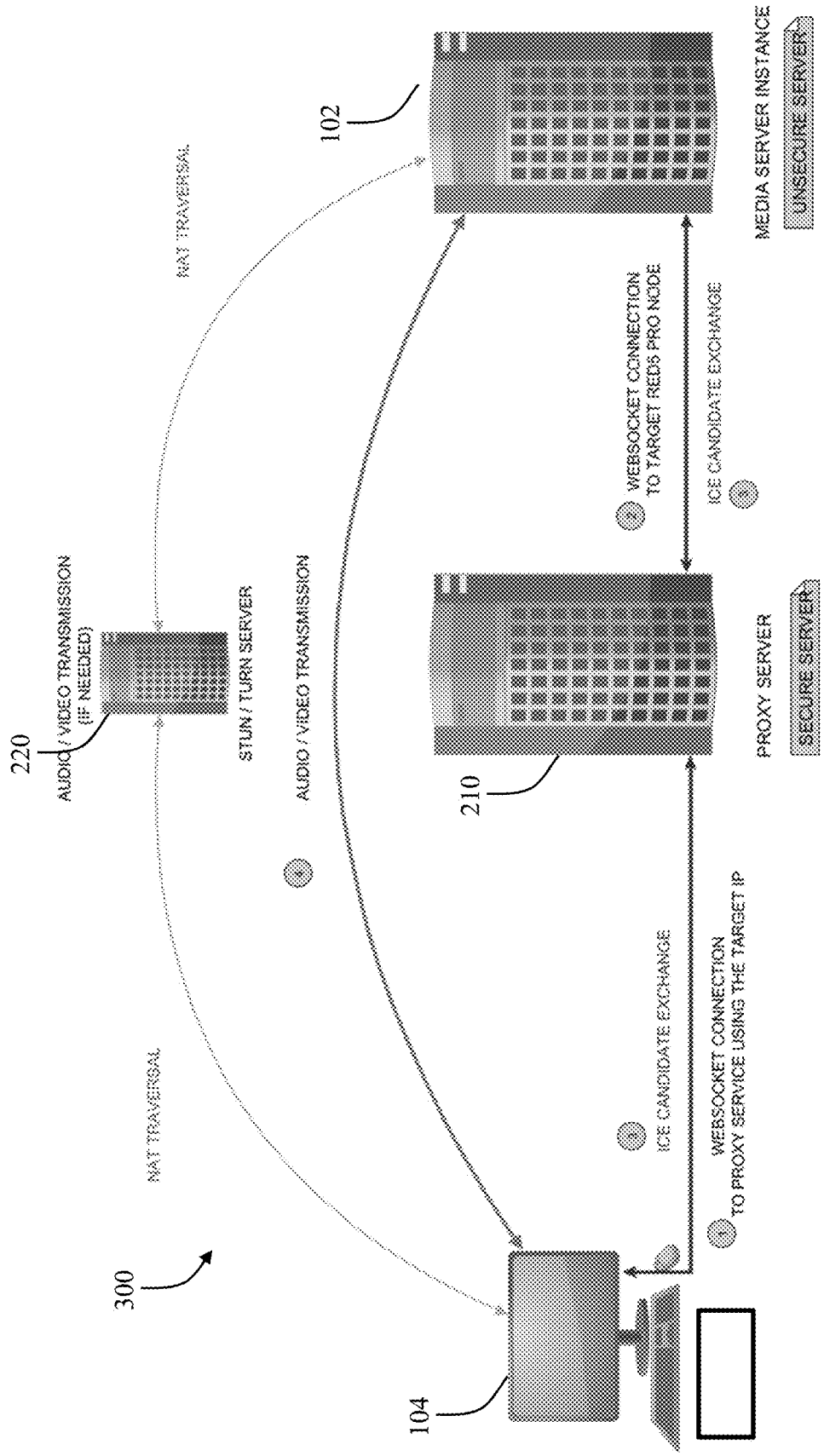
FIG. 3 is an exemplary process for establishing a multimedia session using a stream manager proxy server, in accordance with the present invention.

FIG. 3 depicts an example implementation of a signaling and negotiating process 600 for setting up a WebRTC communication in system 100. In particular, FIG. 3 shows an overview of an exemplary process 300 for establishing WebRTC communication between a subscriber device 104 and a publisher device 102 using a stream manager proxy server 210 as an intermediary. Initially, the stream manager proxy server 210 is setup as a secure server. For example, the stream manager proxy server 210 is created with a domain name and an SSL certificate such that it can be used as part of a secure connection. The stream manager proxy server 210 proxy can be configured as entry points for broadcaster devices 102 and subscriber device 104 (e.g., between a subscriber device 104 and edge node 108 and/or a broadcaster 102 and an origin node 106). The SSL certificate will allow the setup a real-time communication (e.g., via WebRTC connections) and compliance with rules enforced by web browsers (e.g., Cross-Origin Resource Sharing (CORS)). Additionally, SSL is required for the signaling phase in WebRTC, which can be done over HTTPS or Secure WebSockets (WSS). Once the signaling is completed the stream manager proxy server 210 proxy node is no longer required and the browser (e.g., on the subscriber device 104) can connect directly with another node (e.g., origin node 106 or publisher device 102) to exchange multimedia. This provides the benefit of protocols such as WebRTC without restrictions created by secure and unsecure devices trying to utilize said protocols.

At Step 1 of the process 300, a client on a subscriber device 104 connects to the stream manager proxy server 210 over a secure connection. The subscriber device 104 also sends and address for an intended publisher device 102 (e.g., media server) that it wants to exchange multimedia. For example, the client can negotiate a connection to the stream manager proxy server 210 proxy using a WebSocket Secure (WSS) protocol and can provide a target IP for the media server of the publisher device 102.

At Step 2 of the process 300, using the target address for the publisher device 102 (as provided by the client subscriber device 104), the stream manager proxy server 210 can establish a server to server connection between itself and the target publisher device 102 media server rather than over an unsecure connection (when the media server does not have a domain name/SSL). For example, the stream manger 210 proxy server can establish a server to server connection using the WebSocket (WS) protocol to connect to an unsecure device on a private cloud network. The combination of the secure WebSocket connection with the subscriber device 104 and the server to server connection with the publisher device 102 creates a traversal bridge between the subscriber device 104 and the publisher device 102 via the stream manager proxy server 210 (e.g., via bidirectional messaging over WebSockets). Once established, the bridge provides a proxy channel that allows for secure data to flow to an unsecure endpoint and vice versa, even when implemented within protocols that typically do not allow such functionality (e.g., WebRTC). Accordingly, the stream manager proxy server 210 can be used to establish WebRTC communications between a web browser (e.g., on a subscriber device 104) and an unsecure media server (e.g., publisher device 102) which typically would not be permitted. Although the example provided herein relates to the utilization of WebSockets for signaling and proxying, the invention is not intended to be limited to using WebSockets for WebRTC signaling. Any combination of techniques to send signaling data between devices can be utilized without departing from the scope of the present invention. For example, since HTTP has similar functions and restrictions as WebSockets, the present invention can be used to proxy a secure HTTPS call to a non-secure HTTP connection on the cluster node.

In some embodiments, the stream manager proxy server 210 is configured to host a socket proxy service, a targeted media server instance, and a client for communicating across the proxy channel. For example, in a WebRTC implementation, the stream manager proxy server 210 hosts a WebSocket proxy protocol, with a targeted media server instance, and the WebRTC client using JavaScript for communicating across the proxy. In particular, the stream manager proxy server 210 is configured to facilitate all the services and protocols for the two peer devices (e.g., the subscriber device 104 and the publisher device 102) to communicate with each other using the open WebRTC standards.

To initialize the WebRTC session, after the proxy channel connection to the stream manager proxy server 210 has been established, both the peer devices must know about one another's location, capabilities, and other necessary details (e.g., World Wide Web Consortium (W3C) standards). This step is known as the peer discovery, and in some embodiments, signaling is exchanged between the subscriber device 104 and the publisher device 102 over the proxy channel for peer discovery. Typically, when utilizing a WebRTC protocol there are at least two types of signaling data that is exchanged. The types include Session Description Protocol (SDP) session control messages and ICE candidates. SDP is a format for describing the capabilities of a media capable device. In the present invention, the media capable devices can be any of the origin nodes 106, the edge nodes 108, the subscriber devices 104, and the publisher devices 102. During the signaling/peer discovery process, using SDP, the devices can each send a list of their capabilities (e.g., which codecs it can use, the resolutions it can produce, and other detailed information to set-up the stream) to each another.

Once each of the devices agree on how to communicate with one another, based on the shared information and capabilities, the process 300 moves to the ICE candidates phase (Step 3). ICE is a protocol used to help establish connections between devices across the Internet. The information in an ICE candidate includes whether to use UDP or TCP for transmission, the IP address of the client, and other details for making a direct connection to the peer. In particular, ICE is utilized to find the best path to connect peer devices. As would be appreciated by one skilled in the art, the best path may be direct connection between the devices or can be provided when a direct connection is not possible (i.e. behind Network Address Translations (NATs)).

ICE also can include two sub-protocols known as Session Traversal Utilities for Session Traversal Utilities for NAT (STUN) and Traversal Using Relays around NAT (TURN) to help connect the devices. STUN servers are used to bypass firewalls/NATs and TURN servers are an extension of STUN that are used if a direct peer-to-peer (P2P) connection cannot be established using STUN. To enable their respective functionalities, STUN server allows clients to find out their public address, the type of NAT they are behind and the Internet side port associated by the NAT with a particular local port and TURN servers use a protocol that allows a client to obtain IP addresses and ports from such a relay. STUN and TURN servers can be fundamental to be able to set-up WebRTC connections, in accordance with the present invention. ICE candidates and the details of STUN/TURN servers can be communicated during the signaling stage. Additionally, browser clients can include an API to define the STUN/TURN server that are preferred to be utilized.

Once peer discovery is complete, and ICE data has been obtained, the peer devices exchange this data with each other so that the WebRTC session (e.g., multimedia streaming) can be established between them. The ICE data exchange can be accomplished over standard a WebSocket proxy connection between the client and the media server. In some embodiments, a WebSocket channel is established between the subscriber devices 104 and the publishing device 102 on the proxy channel to generate a suitable message format for relaying the ICE data between the peer devices.

Thereafter, at Step 4 of the process 300, the connectivity can be established between devices and multimedia streams can flow directly between them or via NAT over the STUN/TURN server(s) 220 if direct data flow is not possible. It is important to note that the proxy channel can be used to manage discovery, establish, and maintain a connection between a secure device and an unsecure device while the connection between the devices (or over NAT) is utilized to share multimedia between the devices.

In some embodiments, the stream manager proxy server 210 can implement a standard mechanism for connection management spawn multiple WebSocket proxy bridges at any given time over WebSocket. This enables the stream manager proxy server 210 to be utilized in dynamic environments (e.g., virtual devices) with multiple instances running for a particular publisher. For example, the stream manager proxy server 210 can be configured to work with publisher devices 102 implemented in cloud environments. When working streaming on cloud infrastructures, or any large-scale deployment, the most useful and efficient feature used in cloud computing is "Auto Scaling". Auto scaling allows a system to dynamically scale the size of a server fleet by adding and/or removing media server instances as the traffic/demand shrinks or expands. For example, as a media server has more client requests, the system can auto scale to expand the number of virtual machines to facilitate the requests and maintain multimedia stream quality.

FIG. 4 depicts an example of auto scaling using a stream manager proxy server 210. In the example implementation of FIG. 4, the cluster on the left of FIG. 4 has an origin server 106 used for incoming streams, and two edge nodes 108. Once a threshold has been reached, and is detected by the stream manager 210 (based on a configuration on the stream manager), that the cluster needs more capacity for subscriber clients connected to the edge nodes, the system will "scale out". Scaling out means that the stream manager 210 will spin up a new virtual instance (e.g., using a cloud network API), and assign roles to the new instances, as shown in the cluster on the right side of FIG. 4. In some embodiments, an edge node 108 can be assigned as an entry point to the new instance, as depicted in FIG. 4. Similarly, once a load on the nodes reaches a minimum threshold (also defined in the stream manager 210), the stream manager 210 can "spin down" an entry edge node 108 to a surplus cluster and remove the cluster (e.g., scale in). As would be appreciated by one skilled in the art, although FIG. 4 depicts scaling in and out with edge nodes 108 (accessing clusters of instances), the same system 100 can be used to spin up and spin them down new origin nodes 106 based on the need to allow more publishing clients on the system 100. Additionally, as would be appreciated by one skilled in the art, the proposed system is not limited to cloud infrastructure with virtualized machine instances only. It can be used with physical hardware based hosted nodes in a similar manner.

For example, the same infrastructure can be used for physical hardware, and bring online and offline these physical instances of media server nodes.

Continuing with FIG. 4, a cloud computing environment is depicted with multiple clusters that include a plurality of edge devices 108 and origin devices 106. One benefit of cloud computing is the ability to auto scale the number of computing entities. As would be appreciated by one skilled in the art, when auto scaling in a cloud computing environment, the server instances are created and removed in real time as dynamic instances. Dynamic instances, however, are truly "dynamic" as their IP addresses change between system startups, such that it is not possible for system administrators to install Secure Socket Layer (SSL) certificates on these instances, given the complexity of time and availability. Even if a system does not use an auto scaling system, there is still the problem of scaling SSL enabled nodes even on a manually managed setup. Having to install SSL on instances manually for every existing WebRTC server and having to do the same when adding new instances can be very time consuming and impractical. Accordingly, streaming clusters including origin nodes 106 and edge nodes 108 may not have SSL on them, since they are dynamic cloud instances with a temporarily allocated IP address. Therefore, the origin nodes 106 and edge nodes 108 may not be considered secure connections by the WebRTC interface and can utilize the proxy server of the present invention to interact.

In some embodiments, the stream manager proxy server 210 is provided in conjunction with the cloud platform's APIs to provision dynamic auto scaling functionality to a streaming architecture. In other words, to enable WebRTC communication from an unsecure endpoint (e.g., dynamic endpoints), the present invention offers negotiations between WebRTC participants and cloud/virtual instances through the stream manager proxy server 210. This enables the ability for a system to scale-out and scale-in (e.g., load balancing) efficiently, depending on a network load, without sacrificing the benefits of utilizing the WebRTC protocol. As discussed with respect to FIG. 3, in this configuration, the stream manager proxy server 210 instance itself is SSL enabled with a registered public domain name for hosting WebRTC services and can provide a WebSocket proxy service for the devices that cannot do so on their own (e.g., due to an unsecure device being a participant). As such, the stream manager proxy server 210 can act as a negotiator configured to pass WebRTC session setup information between a plurality of secure subscriber devices 104 client and unsecure publisher devices 102 (e.g., server) in a cloud (or similar) environment, thereby bypassing the mandatory secure connectivity policy irrespective of whether or not the publisher device 102 provides a secure connection (e.g., SSL installed with a Domain name).

Figure 5:
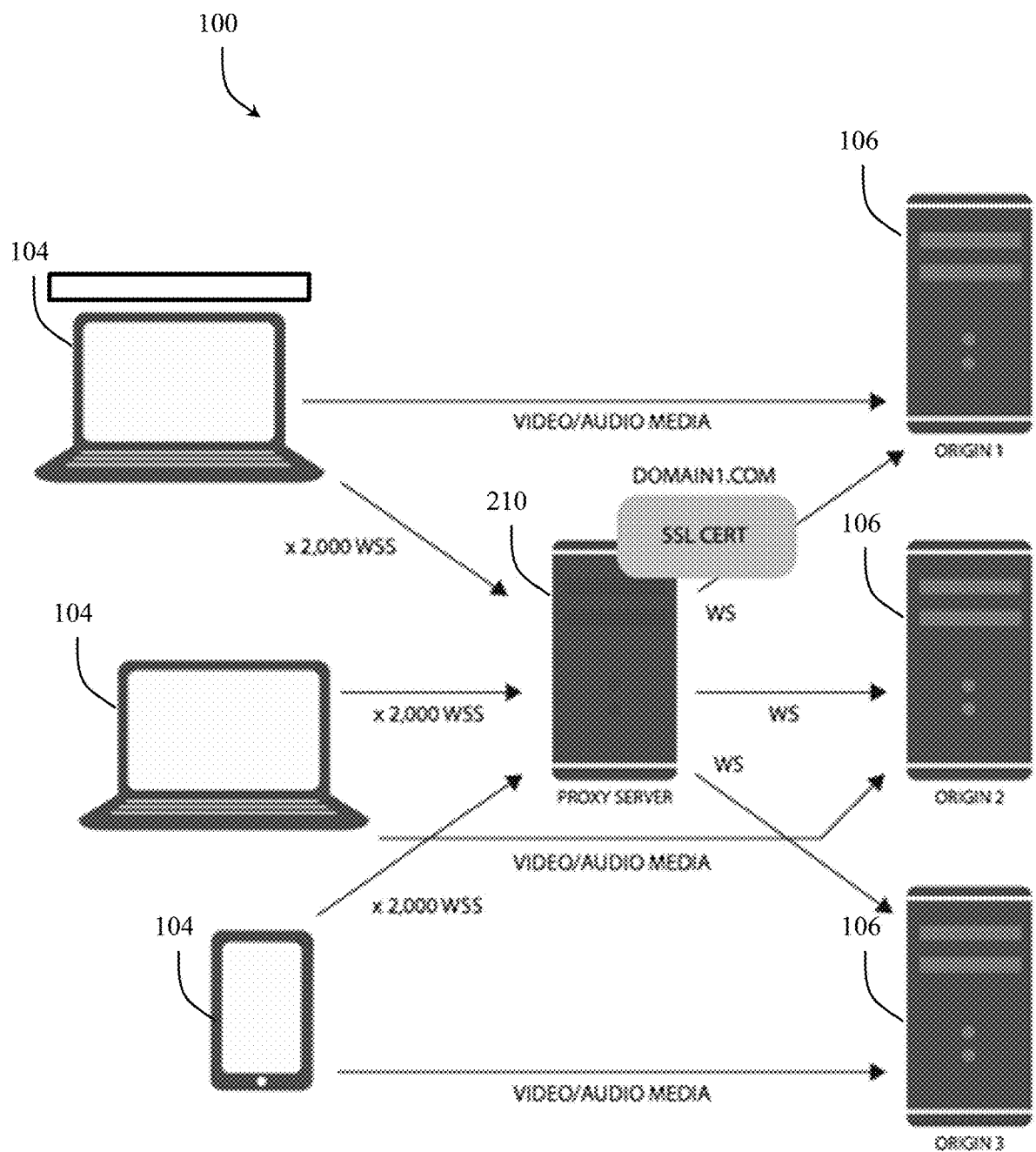
FIG. 5 is an exemplary operation of a stream manager proxy server, in accordance with the present invention.

In some embodiments, the proxy server 210 can be used to set up a connection between multiple origin nodes 106 for publisher devices 102. FIG. 5 depicts how a stream manager proxy server 210 can be used to set up a connection between multiple subscriber devices 104 and multiple origin nodes 106 for publisher devices 102 (e.g., media servers). As depicted is FIG. 5, the stream manager proxy server 210 can be associated with a domain name (e.g., DOMAIN1.COM) and can have an SSL certificate. In operation, the subscriber devices 104 will connect to the stream manager proxy server 210 directly using WSS and will share the IP address of the origin node 106 for the publisher that the subscriber device wishes to share multimedia with. Thereafter, the stream manager proxy server 210 can connect directly with the specified origin node 106 using the provided IP address and WS to establish a server to server connection. Once that process is complete, the broadcaster device 102 (via an origin node 106) and subscriber device 104 can share multimedia directly with one another, as depicted in FIG. 5. Alternatively, if direct sharing is not possible, the broadcaster device 102 and subscriber device 104 can share multimedia over NAT, as discussed in greater detail herein with respect to FIG. 3. Although FIG. 5 depicts the utilization of subscriber devices 104 and origin nodes 106, any combination of device connections can be utilized without departing from the scope of the present invention. For example, the stream manager proxy server 210 can be the only connection between subscriber devices 104 and publisher devices 102 or there can be a network of origin nodes 106 and edge nodes 108 facilitating the connection between the subscriber devices 104 and publisher devices 102 (e.g., similar to the structures discussed with respect to FIGS. 1A, 1B, and 2).

In some embodiments, the stream manager proxy server 210 can facilitate capturing and transferring a client's original IP address using custom headers over the proxy connection. Generally, with proxies, the originating client IP address is overwritten by the proxy's IP address and headers can provide a great deal of information about the original client behind the proxy. If the original IP of the client is not transmitted to server, it is difficult to distinguish and track connections from different locations. Utilizing unique headers, the stream manager proxy server 210 can preserve and transmit the original client information using the custom header so that the media server node across the network knows the original IP address of the client. This is useful for analytics, geo-mapping location based authentication and much more.

An example of a header for use in accordance with the present invention is {Sec-WebSocket-Key=XsuhAp80WSWenevmuV1FeQ==, X-Forwarded-For-Meta-Port=52965, X-Forwarded-For-Meta-Type=WEB, User-Agent=Mozilla/5.0 (Windows NT 10.0; WOW64; rv:53.0) Gecko/20100101 Firefox/53.0, Sec-Web-Socket-Version=13, X-Forwarded-For=192.168.1.45, X-Forwarded-For-Meta-Secure=false, Sec-WebSocket-Protocol=json}. The X-Forwarded-For block can be used for the IP address of the originating client. The X-Forwarded-For-Meta-Secure block can be used to relay whether the client session is over secure connection (or not). This information can be obtained through the WebSocket connection object. The X-Forwarded-For-Meta-Port block can be used to relate the originating client's port and the X-Forwarded-For-Meta-Type block can be used to provide information about the originating client's connection type.

In some embodiments, the stream manager proxy server 210 is designed to work with a cloud load balancer solution to help scale up the capacity for the net WebRTC proxy connections passing through it. As would be appreciated by one skilled in the art, any load balanced TCP/UDP based system and combination of architecture (cloud or non-cloud environment) could be used without departing from the scope of the present invention. In operation, one or more stream manager proxy server 210 instances can be created on the cloud infrastructure and can load-balance the instances using a load balancer provided by the cloud platform. Each stream manager proxy server 210 instance can manage its own proxy connections to the media server endpoint (e.g., publisher device 102 or origin node 106) and each client WebSocket connection (e.g., subscriber device 104 or edge node 108) to proxy is established over the load balancer.

Figure 6:
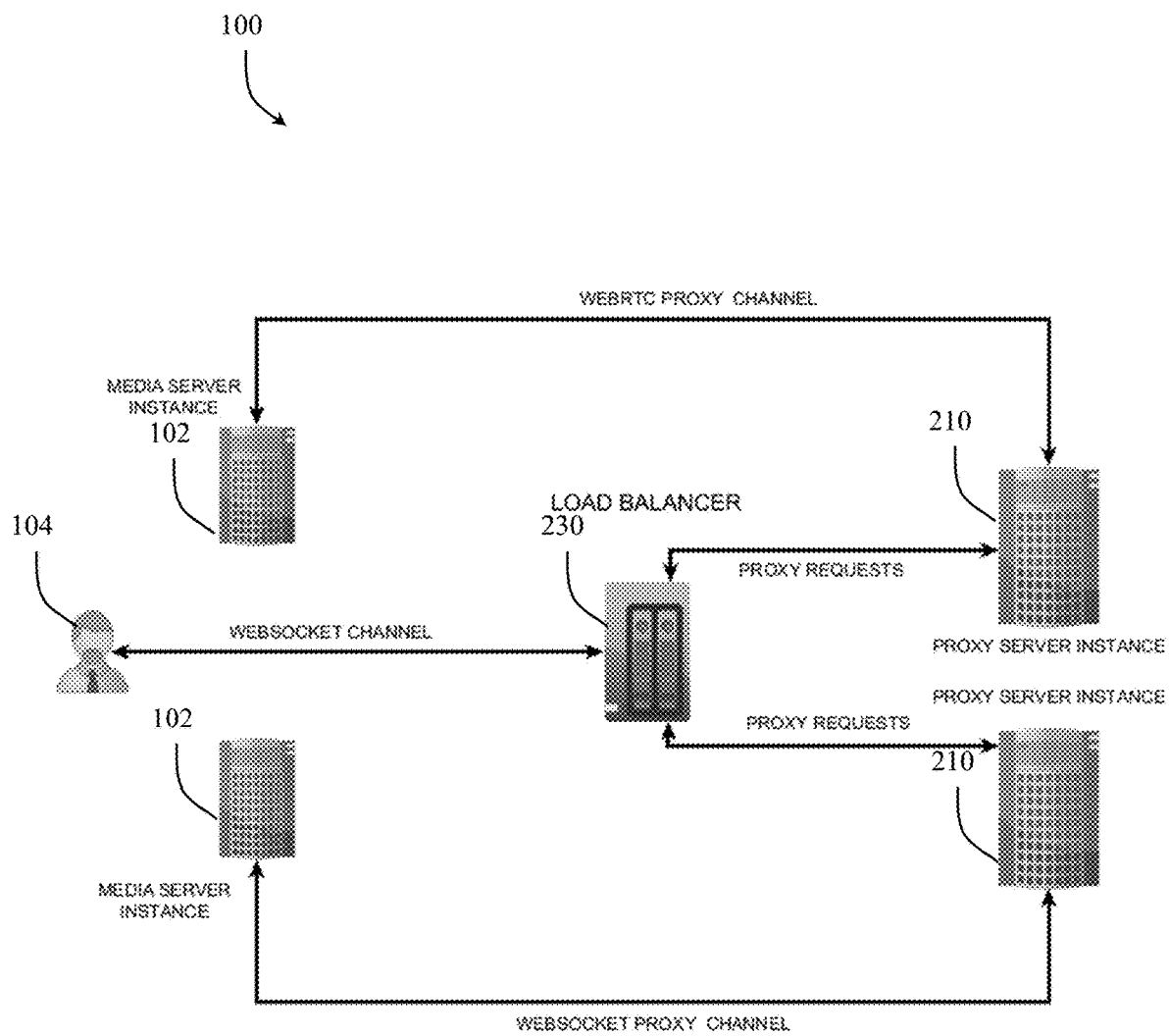
FIG. 6 is an exemplary process for implementing load balancing with a stream manager proxy server, in accordance with the present invention.

FIG. 6 depicts an example implementation in which a load balancer 230 is implemented within the system 100. In particular, FIG. 6 depicts an example implementation of the system 100 with a load balancer 320 and how it interacts with the subscriber device 104 and publisher devices 102. In operation, multimedia data is received from web browser client WebSocket connection and proxied through load balancer and then through the stream manager proxy server 210 before it reaches the intended media server node. Initially, a client on a subscriber device 104 submits a request for consuming proxy services (e.g., for a connection to an unsecure media server via a web browser). For each proxy request submitted by a client, the load balancer 230 can select a different stream manager proxy server 210 instance to use, based on the existing traffic/network status for each of them. Thereafter, the client connects to the proxy service provided by the stream manager proxy server 210 by providing an IP address for a target publisher device 104 and starts an ICE negotiating and signaling process (e.g., as discussed with respect to FIGS. 2-5). After receiving the ICE information, the client sets up a connection between each other and initiates a media transmission directly or using a NAT, if necessary. If any data transmission is needed during the media transmission then the data flows over the established proxy bridge provided by the stream manager proxy server 210.

In some embodiments, the stream manager proxy server 210 uses a special 'pinger' mechanism to keep prevent the load balancer from closing the WebSocket connection by continuously pinging client connections to make sure that they are alive. Additionally, when using a load balancer 230, the transmissions are getting proxied twice. In particular, the transmission is proxied the first time when it goes through the load balancer 230 and the second time when it goes through the stream manager proxy server 210. Since the protocol of transmission is real-time there is almost no delay even when the data is going through two servers.

Figure 7:
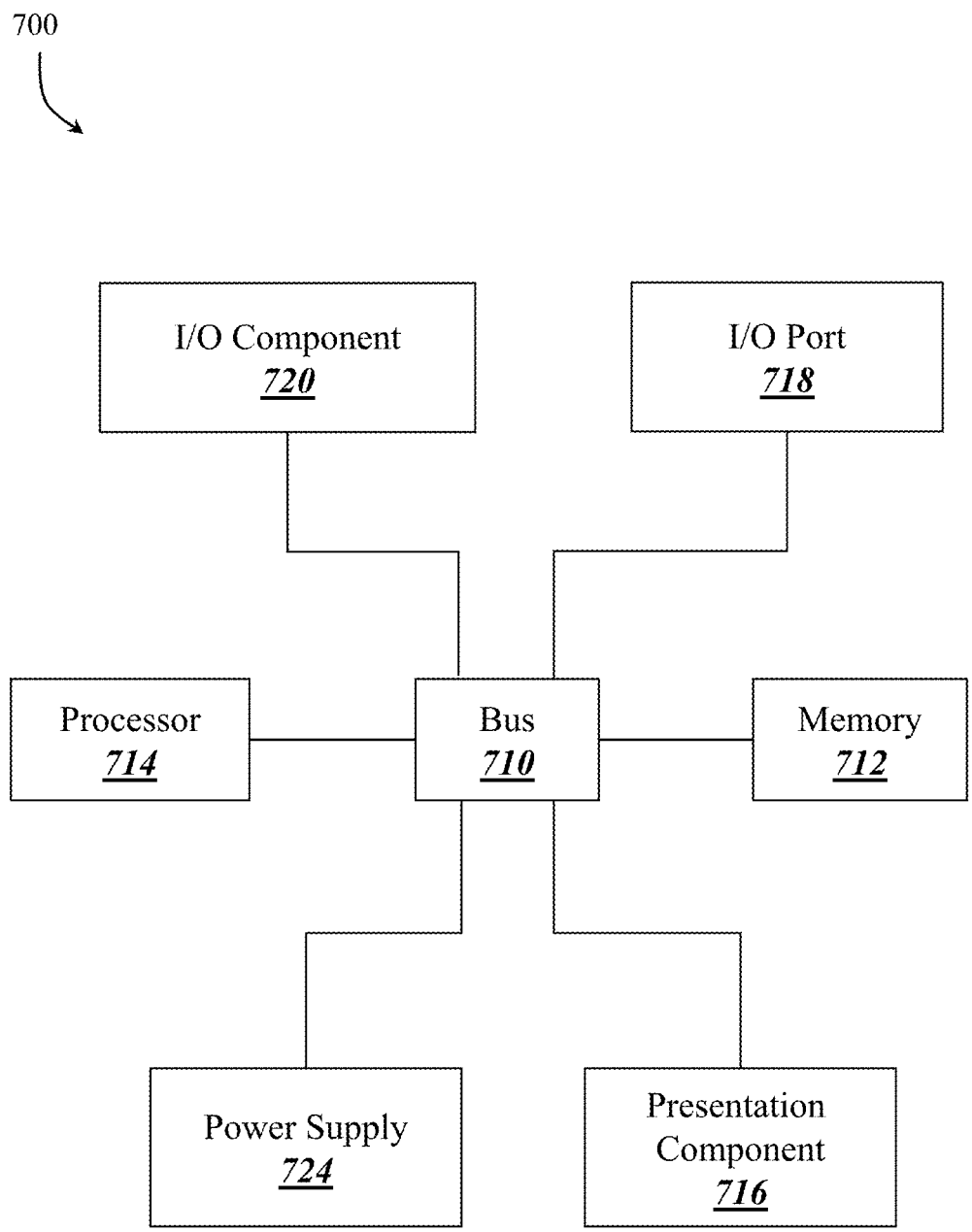
FIG. 7 is an exemplary computer architecture, in accordance with the present invention.

Any suitable computing device can be used to implement the computing devices (e.g., via the publisher device 102, subscriber device 104, origin nodes 106, edge nodes 108, stream manager proxy server 210, etc.) and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 700 is in FIG. 7. The computing device 700 is merely an illustrative example of a suitable computing environment and in no way limits the scope of the present invention. A "computing device," as represented by FIG. 7, can depicted in FIG. 7 include a "workstation," a "server," a "laptop," a "desktop," a "handheld device," a "mobile device," a "tablet computer," or other computing devices, as would be understood by those of skill in the art. Given that the computing device 700 is depicted for illustrative purposes, embodiments of the present invention may utilize any number of computing devices 700 in any number of different ways to implement a single embodiment of the present invention. Accordingly, embodiments of the present invention are not limited to a single computing device 700, as would be appreciated by one with skill in the art, nor are they limited to a single type of implementation or configuration of the example computing device 700.

The computing device 700 can include a bus 710 that can be coupled to one or more of the following illustrative components, directly or indirectly: a memory 712, one or more processors 314, one or more presentation components 716, input/output ports 718, input/output components 720, and a power supply 724. One of skill in the art will appreciate that the bus 710 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present invention, and in no way, limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for streaming multimedia data from a broadcaster device to a subscriber device that uses a secure transmission protocol, wherein the multimedia data is streamed using a network of devices, comprising one or more origin devices and one or edge devices connected by a network, the origin and edge devices not supporting establishment of the secure transmission protocol over the network, the method comprising:

receiving, at a proxy service via a secure transmission protocol, a connection request from a subscriber device among a plurality of subscriber devices, the connection request including data indicating a stream of multimedia data from a broadcaster device, the broadcaster device having a connection with an origin device among the one or more origin devices, wherein the network connects the origin device and an edge device, among the one or more edge devices, assigned to the subscriber device to deliver the indicated stream, received from the broadcaster device through the origin device and the network, to the subscriber device, the origin and edge devices not supporting establishment of the secure transmission protocol over the network;

establishing a first bridge between the subscriber device and the edge device assigned to the subscriber device using the proxy service;

utilizing a proxy channel over the first bridge to negotiate a first connection between the subscriber device and the edge device assigned to the subscriber device, such that signaling and negotiation information of the secure transmission protocol for streaming the indicated stream are sent over the first connection; and controlling streaming of the indicated stream of multimedia data from the broadcaster device to the subscriber device, by controlling streaming of the indicated stream from the broadcaster device to the origin device, streaming of the indicated stream from the origin device over the network not using the secure transmission protocol to the edge device assigned to the subscriber device, and streaming the indicated stream from the edge device to the subscriber device while exchanging data of the secure transmission protocol for streaming the indicated stream between the subscriber device and the edge device over the first connection.

2. The method of claim 1, wherein the proxy service is implemented on a stream manager server configured with a domain name and an Secure Socket Layer (SSL) certificate.

3. The method of claim 2, wherein the stream manager server is implemented on a cloud infrastructure.

4. The method of claim 1, wherein the establishing the first bridge comprises negotiating session setup information between the subscriber device and the edge device using an Interactive Connectivity Establishment (ICE) technique.

5. The method of claim 1, wherein the first bridge comprises a connection between the subscriber device and the proxy service using a WebSocket secure (WSS) secure connection or a Hypertext Transfer Protocol Secure (HTTPS) connection and the connection between the edge device and the proxy service uses a Web Socket (WS) unsecure connection or a Hypertext Transfer Protocol (HTTP) connection.

6. The method of claim 1, wherein the bridge enables secure data to flow from a secure subscriber device to an unsecure edge device.

7. The method of claim 1, wherein the subscriber device connects to the proxy service from a web browser client.

8. The method of claim 1, wherein the origin device and the edge device are media servers without a domain or SSL certificate.

9. The method of claim 1, wherein the proxy service is configured to keep the first bridge open during the streaming of the multimedia data to the subscriber device using a pinger mechanism.

10. The method of claim 1, further comprising balancing load between subscriber devices and edge devices with a load balancer.

11. The method of claim 1, wherein the proxy service provides WebRTC information exchange between the subscriber device and the edge device assigned to the subscriber device.

12. The method of claim 1, further comprising creating custom headers to track original client information for the subscriber device and the edge device.

13. The method of claim 1, further comprising:
the proxy service further establishing a second bridge between the broadcaster device and an origin device among the one or more origin devices via the proxy service; and
the proxy service further utilizing a proxy channel over the second bridge to negotiate a connection between the broadcaster device and the origin device.

14. A system for streaming multimedia data from a broadcaster device to a subscriber device that uses a secure transmission protocol, wherein the multimedia data is streamed using a network of devices, comprising one or more origin devices and one or edge devices connected by a network, the origin devices and the edge devices not supporting establishment of the secure transmission protocol over the network, the system comprising:
- a proxy service in electronic communication with a plurality of subscriber devices using a secure transmission protocol;
- a network of devices, comprising one or more origin devices and one or edge devices connected by a network, the origin devices and the edge devices not supporting establishment of the secure transmission protocol over the network;
- wherein a broadcaster device has a connection with an origin device among the one or more origin devices, wherein the network connects the origin device and the one or more edge devices,
- wherein the proxy service, in response to receiving, over the secure transmission protocol, a connection request from a subscriber device among the plurality of subscriber devices, the connection request including data indicating a stream of multimedia data from the broadcaster device, is configured to:
  - establish, via the proxy service, a first bridge between the subscriber device and an edge device among the one or more edge devices assigned to deliver the indicated stream, received from the broadcaster device through the origin device and the network, to the subscriber device, and
  - utilize a proxy channel over the first bridge to negotiate a first connection between the subscriber device and the edge device assigned to the subscriber device, such that signaling and negotiation information of the secure transmission protocol for streaming the indicated stream are sent over the first connection; and
- wherein the broadcaster device streams the indicated stream of multimedia data from the broadcaster device to the origin device, the origin device streams the indicated stream of multimedia data over the network not using the secure transmission protocol to the edge device assigned to the subscriber device, and the edge device streams the indicated stream of multimedia data to the subscriber device while the subscriber device and the edge device exchange data of the secure transmission protocol for streaming the indicated stream over the first connection.

15. The system of claim 14, wherein the proxy service is implemented on a stream manager server configured with a domain name and an Secure Socket Layer (SSL) certificate.

16. The system of claim 15, wherein the stream manager server is implemented on a cloud infrastructure.

17. The system of claim 14, wherein the establishing the first bridge comprises negotiating session setup information between the subscriber device and the edge device using an Interactive Connectivity Establishment (ICE) technique.

18. The system of claim 14, wherein the first bridge comprises a connection between the subscriber device and the proxy service using a Web Socket secure (WSS) secure connection or a Hypertext Transfer Protocol Secure (HTTPS) connection and the connection between the edge device and the proxy service uses a Web Socket (WS) unsecure connection or a Hypertext Transfer Protocol (HTTP) connection.

19. The system of claim 14, wherein the bridge enables secure data to flow from a secure subscriber device to an unsecure edge device.

20. The system of claim 14, wherein the subscriber device connects to the proxy service from a web browser client.

21. The system of claim 14, wherein the edge device is a media server without a domain or SSL certificate.

22. The system of claim 14, wherein the proxy service is configured to keep the first bridge open during streaming of the multimedia data to the subscriber device using a pinger mechanism.

23. The system of claim 14, further comprising a load balancer for balancing load between subscriber devices and edge devices.

24. The system of claim 14, wherein the proxy service provides WebRTC information exchange between the subscriber devices and the edge devices.

25. The system of claim 14, further comprising creating custom headers to track original client information for the subscriber device and the edge device.

26. The system of claim 14, further comprising:
- the proxy service further establishing a second bridge between the broadcaster device and an origin device among the one or more origin devices via the proxy service; and
- the proxy service further utilizing a proxy channel over the second bridge to negotiate a connection between the broadcaster device and the origin device.

* * * * *